Oct. 11, 1955      R. J. CHAMBERS      2,720,648
DIRECTION FINDING SYSTEMS AND RECEIVING CHANNELS
Filed June 11, 1952      2 Sheets-Sheet 1

*INVENTOR.*
RUSSELL J. CHAMBERS
BY John W. Michael
ATTORNEY

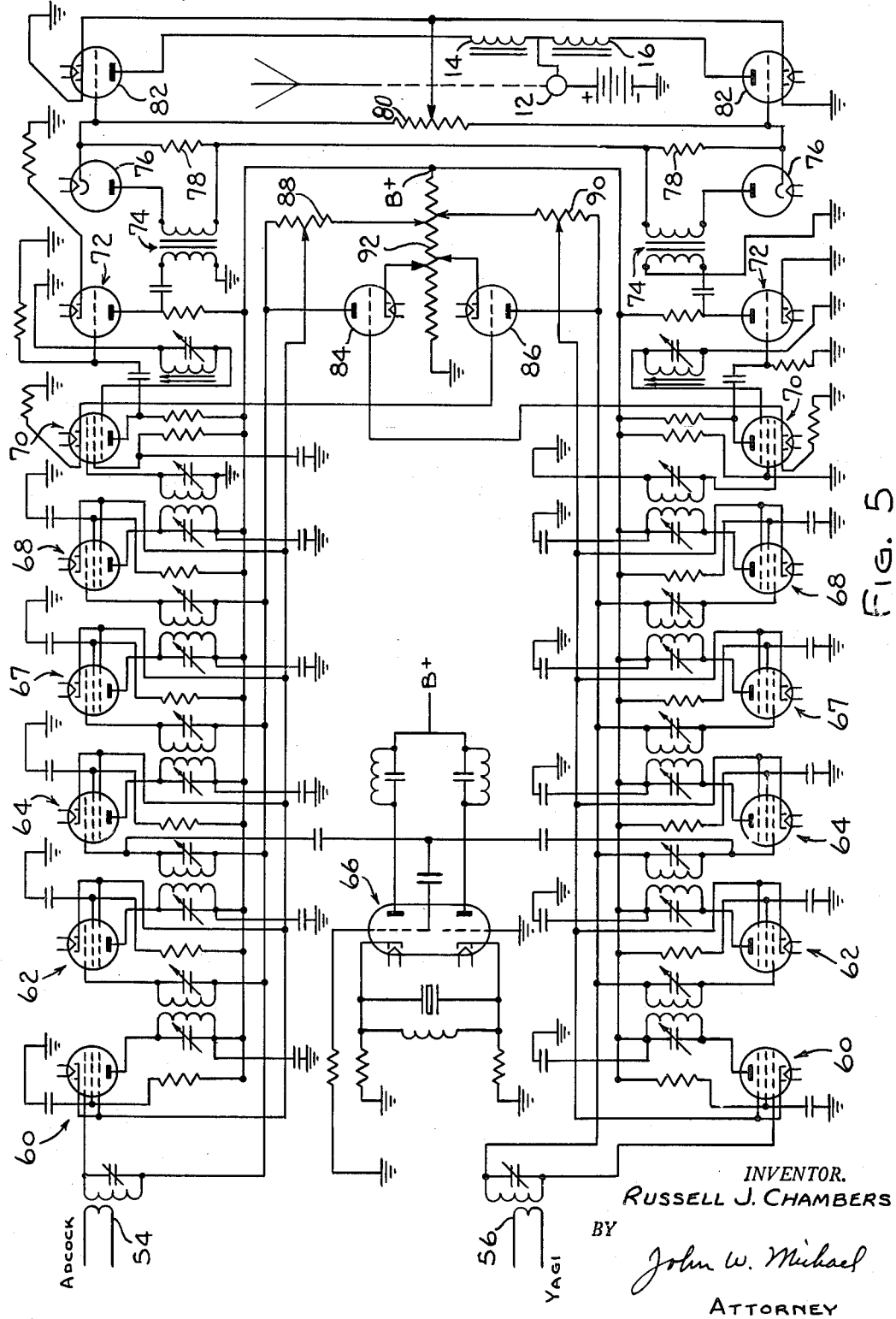

United States Patent Office 2,720,648
Patented Oct. 11, 1955

2,720,648

DIRECTION FINDING SYSTEMS AND RECEIVING CHANNELS

Russell J. Chambers, Springville, Iowa, assignor to Electroport Systems, Inc., Milwaukee, Wis., a corporation of Wisconsin Application June 11, 1952, Serial No. 292,928

8 Claims. (Cl. 343—113)

This invention relates to improvements in direction finding systems and receiving channels and particularly to such systems and channels using high or ultra-high frequencies and short or ultra-short wave lengths.

Prior finding systems of this class have had limited use as radio goniometers because the bearings obtained have been bidirectional and inaccurate. Manual operation of the wave collector has been employed making such systems inefficient. Where automatic sensing was used the accuracy was so poor that the systems and channels were not commercially usable for many important applications.

It is an object of this invention, therefore, to provide a direction finding system which is unidirectional, highly accurate, automatically sensing, and may be constituted of light, compactly arranged elements.

Another object is to provide receiving channels greatly multiplying a minute change in signal voltage and providing sensing more accurate than heretofore obtained.

In its broad aspects this invention utilizes two directive arrays to produce two horizontal sensitivity patterns, parts of said patterns overlapping to provide an area in which a signal or wave emanating from a single source results in inducing voltage in the antennae of each of the two arrays. One pattern has an area which for practical applications has a signal value sufficient for tracking through all but a few degrees of 360°. The other pattern is narrow, occupying but a few degrees in width. It is directed along the null of the first pattern. The voltage that is induced in the wide pattern is utilized to produce rotation of the antenna array in one direction. The voltage that is induced in the narrow pattern is utilized to produce rotation of the antenna array in the opposite direction. Thus, in the overlapping portion of the patterns, the array will be brought to a balanced position and thus accurately indicate the source.

In order to provide greater accuracy, one of the two voltages is picked up by one channel and the other voltage is picked up by another channel of a twin channel receiver. Each channel has the usual provision for amplification at both radio and intermediate frequency stages and an output stage inductively coupled with the diode rectifier and connected by a thyratron to the field of a split field series wound motor. Such motor drives the array depending upon whether the channels are in balance or out of balance. To make the receiver more sensitive the two channels are connected to the same single oscillator and two direct current amplifiers are cross-connected to control the cathodes and suppressor grids of the amplification stages. Thus if one channel picks up voltage in excess of the other channel, the crossed automatic voltage control will lower the sensitivity of the other channel, thereby greatly amplifying any change in the differences in the voltage received. This makes the channels very sensitive to the smallest change in signal voltage, and hence the accuracy of the system is increased to the extent that it has much wider practical application.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

Fig. 5 is a schematic diagram of the dual channel receiver employed in the radio direction finder embodying this invention.

Figure 1:
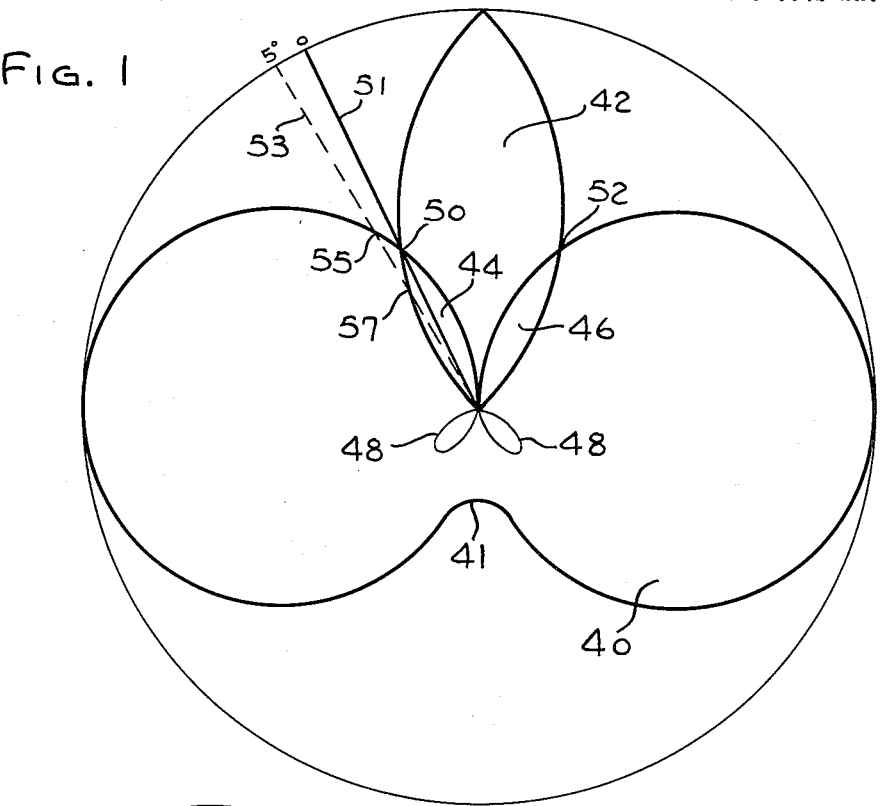
Fig. 1 is a schematic diagram of the theoretical sensitivity patterns produced by the directive array embodying this invention.
Figure 2:
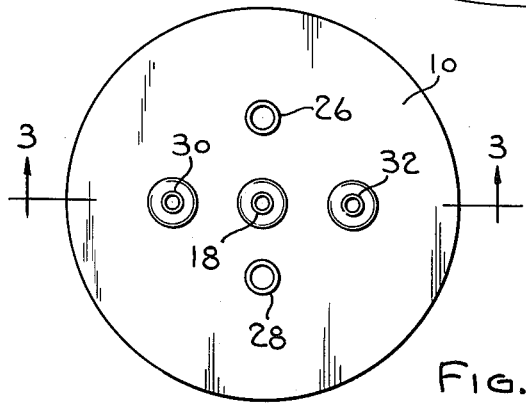
Fig. 2 is a top plan view of an antenna array embodying this invention.
Figure 4:
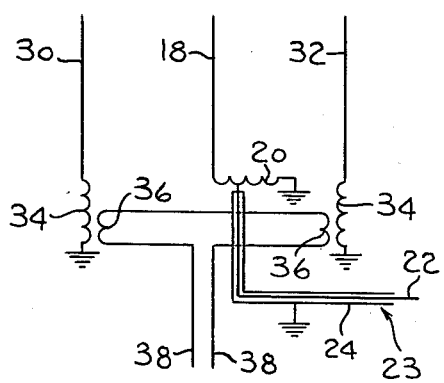
Fig. 4 is an equivalent circuit diagram of the antenna array.
Figure 3:
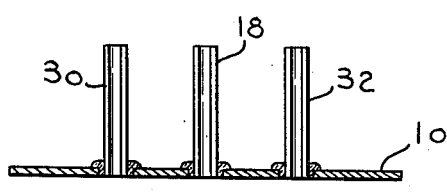
Fig. 3 is a sectional view taken on the line 3—3 of Fig. 2.

Referring to the drawings, the directive antenna array comprises five elements carried on a base 10 which is mounted for rotation about a central vertical axis. The motor 12 for driving the base is illustrated diagrammatically in Fig. 5 and has a forward field winding 14 controlled by the Adcock channel of the receiver and a reverse field winding 16 controlled by the Yagi channel of the receiver. The five elements are arranged in Yagi type. The center or Yagi element 18 of customary design is one-half wave-length (electrical) long and is insulated from the base 10. It is connected at its bottom to a grounded coil 20 having an inductive reactance sufficient to make the element and the coil respond to a full wavelength. The center lead 22 of a coaxial cable 23 is connected to a tap on the coil 20 and the shield 24 of such cable is grounded to the same ground as coil 20. This coaxial cable is inductively coupled with the Yagi channel of the receiver at 56. The other four elements are spaced radially from the Yagi element at ninety degrees angularity. The radial spacing varies in accordance with conventional practice. The forward or director element 26 and the rearward or rear reflector element 28, also of customary design, are both directly grounded to the base 10. The director element 26 is 5% shorter and the rear reflector 28 is 5% longer than the Yagi element 18. The side reflectors 30 and 32, of customary design, are also 5% shorter than the Yagi element 18. Unlike the usual Yagi array, these side reflectors are insulated from the base 10 and are connected at their bottoms to grounded coils 34 each having an inductive reactance sufficient to make such reflectors and coils respond to a full wavelength. The coils 34 have in inductive relation thereto secondary coils 36 connected in series and terminating in a twin lead line 38. This constitutes an Adcock array in form and the elements 30 and 32 will sometimes be referred to as Adcock elements. The twin lead line 38 is inductively coupled with the Adcock channel of the receiver at 54. In practice the twin lead line 38 and the coaxial cable will match the antenna impedances to the receiver input values.

Ordinarily the sensitivity pattern of the Adcock array has a figure 8 shape with a null along a line perpendicular to the plane passing through the elements 30 and 32. However as shown in Fig. 1, the presence of the other elements (Yagi array) distorts this null so that it becomes indistinct, at least at the area designated 41. The Adcock pattern 40 thus has a sensitivity minimum value equal to a value about 45° from maximum. This minimum value is sufficient, if unopposed, to be received by the Adcock channel of the receiver and cause the motor 12 to turn the array in a counter-clockwise direction. The sensitivity pattern 42 of the Yagi array is generally in a forward direction and narrow. However it will overlap the Adcock pattern at the areas designated 44 and 46. There are two small rear lobes 48 on the Yagi pattern which have negligible value. At least their value is so much less than the minimum of the Adcock value that the array will rotate such lobe away from the path of an inmoving source of signal before such signal can be picked up in such lobes. The sensitivity value in the Yagi pattern, if unopposed, is sufficient to cause the motor 12 to turn the array in a clockwise direction.

In this embodiment the point 50 where the signal voltage of the Yagi and Adcock patterns are equal was selected and the windings 14 and 16 arranged so that the array will rotate clockwise under Yagi control and counter-clockwise under Adcock control. So arranged, the other point 52 where signal voltages are equal will be extremely unstable. Any motion however slight away from this point will cause the array to move away from such point and rotate to the other point. Thus for all practical usage a unidirectional sensing is obtained. Assuming that the signal source be moved 5° counter-clockwise from point 50 as indicated by the broken line 53, the voltage in the Adcock array would increase as indicated by point 55 and the voltage in the Yagi array would decrease as indicated by point 57. The difference is approximately 20% of the peak voltage possible in either sensitivity pattern. This great difference for so slight a shift makes the array very sensitive as a direction finder.

There are practical deviations from this theoretical explanation. One, previously mentioned, is the doing away with the complete null in the Adcock pattern. The presence of other resonant elements near the Adcock elements prevents such complete null and creates instead an indistinct null which constitutes the minimum Adcock signal value. A second is the slight distortion of the Yagi pattern due to a signal input from the Adcock elements when at the angle of line 51. A low re-radiation from the Adcock elements causes this. It might be cancelled out if the Yagi element were at the electrical and mechanical center but some negligible deviation will exist without affecting the operation. In any event the array automatically senses the direction of the signal and tracks it under influence of voltage differences induced in the Yagi and Adcock elements.

The receiver shown in the schematic diagram of Fig. 5 has two identical channels. The upper channel will be referred to as the Adcock channel and the lower as the Yagi channel. The Adcock channel is inductively coupled at 54 with the twin lead line 38 of the Adcock elements. The Yagi channel is inductively coupled at 56 to the coaxial cable 23. Both channels have their outputs combined in a single motor 12. Each channel is substantially orthodox being a receiver of the frequency modulated type (FM) and adapted to handle ultra-high frequencies. The signal input or voltage of radio frequency (R. F.) is amplified in conventional R. F. amplifier stages 60 and 62. A mixer stage 64 is inductively coupled with the amplifier stage 62 and a single conventional local oscillator 66 is capacity-coupled to each mixer stage of each channel. The single oscillator coupled with each channel lowers the frequency of the signal and keeps the mixing voltage equal in level and the phase angles identical in each channel. Two stages 67 and 68 of intermediate frequency amplification (I. F.) again amplify the signal at lower frequency. To the I. F. amplifier stage 68 there is inductively coupled a limiter audio-discriminator stage commercial type 6BN7 70 for conventionally affecting the signal. The voltage from the audio output of stage 70 is capacity-coupled to a second audio amplifier stage 72 and connected through a transformer 74 to a diode rectifier 76. The resultant pulsating D. C. (unidirectional) voltage is placed across a load resistor 78. The load resistors of each channel are connected so that the voltages are in opposed polarity. A variable resistor 80 is shunted across the load resistor in combination with the ends thereof connected to the grids of a pair of thyratrons 82. The plates of these thyratrons are connected to the windings 14 and 16 of the motor 12 and the cathodes of the thyratrons are connected to the central part of the resistor 80. The motor 12 is supplied operating power from a D. C. voltage source. Whenever there is an unbalance, D. C. power through the windings 14 and 16 will cause the motor to rotate the array.

An unusual feature of the receiver is the cross bias of the channels to provide for decreased amplification in one channel upon increase in signal voltage in the other channel. Thus a very small change in the signal voltages will be additionally and greatly amplified in the receiver, making its control action more sensitive than heretofore known. To accomplish this two D. C. amplifiers (triodes) 84 and 86 are used to furnish a form of automatic volume control (A. V. C.) to the channels. The voltage excitation for the amplifier 84 comes from the cathode of the discriminator tube of stage 70 of the lower or Yagi channel. The voltage excitation for the amplifier 86 comes from the cathode of the discriminator tube of stage 70 of the upper or Adcock channel. The amplified voltage from the plate circuit of amplifier 84 is applied to the control grids of the pentode high-vacuum tubes in the R. F. stages 60, 62, mixer stage 64, and I. F. stages 67 and 68 of the upper or Adcock channel and the amplified voltage from the plate circuit of amplifier 86 is applied to the control grids of tubes of corresponding stages in the lower or Yagi channel. The cathodes of such controlled tubes in the Adcock channel are connected to a voltage divider network 88 and 92 of the amplifier 84 and the cathodes of controlled tubes in the Yagi channel are connected to a voltage divider network 90 and 92 of the amplifier 86. These voltage divider networks are connected with B+ voltage and the cathodes of the D. C. amplifiers 84 and 86. This creates a form of crossed bias. Assuming both channels are receiving the same level of signal (voltage), the channel outputs are balanced and no movement of motor 12 will take place. However, if a rise in signal level takes place in the Adcock channel, such voltage increase will be impressed on the control grid of the uncontrolled discriminator tube in stage 70 and cause a rise in voltage at the cathode of such tube. Such rise will be in direct ratio to the rise in the signal level. Such voltage increase is placed on the grid of D. C. amplifier 86 and amplified in the plate circuit thereof. This plate voltage is negative with respect to the controlled cathodes in the Yagi channel and will therefore reduce the sensitivity of such channel. Such reduction in the Yagi channel reflected in the uncontrolled discriminator tube in stage 70 of such Yagi channel will cause a reduction in the voltage placed on the grid of D. C. amplifier 84. This latter voltage being negative with respect to the controlled cathodes in the Adcock channel, will therefore increase the sensitivity of such channel. Thus a small signal change from balanced condition is amplified by causing self-repeated magnification in the channel receiving the increase and self-repeated minification in the other channel. While such action appears to be violent, it would be so only when the receiver is first turned on or when the signal source changes its direction abruptly. During practical operation this form of crossed bias reacts much like the conventional A. V. C. The twin channel receiver herein described may be used for other applications. It is described in connection with a directional finder as one means of explaining its function and increased sensitivity.

A description of the broad functioning of the direction finder will assist the understanding of the unit heretofore described. Assume that a signal source enters the Adcock pattern 40 at approximately 120°. The signal voltage induced in the Adcock array and Adcock channel will energize the Adcock motor winding 14 and cause the motor 12 to rotate the array in a counter-clockwise direction, causing the indistinct null 41 and peak voltage area of the Adcock pattern to swing relatively through the signal until the Yagi pattern 42 reaches the signal. The voltage from the signal is then picked up in the Yagi array and channel and will then energize the Yagi motor winding 16 so as to buck the rotation of the motor 12 causing the movement of the array to slow down. As the array is slowing down, however, the signal value of the Adcock pattern is dropping and the signal value of the Yagi pattern is increasing and the Adcock pattern decreasing and the array, after slight waving to and fro, will come to rest with the motor fields in balanced condition. Thereafter the array will track the slightest deviation of the signal source. As previously described, a very slight difference in the voltage induced in one array over that induced in the other array will be greatly multiplied by the form of crossed bias of the channels and thus the accuracy and sensitivity of the tracking is increased beyond any direction finders now available.

Although only one embodiment of the invention is shown and described herein, it will be understood that this application is intended to cover such changes or modifications as come within the spirit of the invention or scope of the following claims.

I claim:

1. A direction finder comprising a single rotating antenna array with at least two sensitivity patterns, one of said patterns being of wide angle and having a null, the second of said patterns being narrow and directed along said null, part of said patterns being overlapped at two areas on opposite sides of said null, said antenna array being capable of receiving a signal from a single source within one of said overlapping portions of said pattern and separating such signal into two separate values, one value being a function of the highest sensitivity level of one pattern along a line extending from the center of the array through said source, the other value being a function of the highest sensitivity level of the other pattern along such line, means for amplifying said separate values so that each value will separately control the operation of a motion transmission device, and a motion transmission device for revolving said antenna array, the windings of said motion transmission being arranged so that voltage from said one pattern will effect rotation of said array in one direction and voltage from said second pattern will effect rotation of said array in the opposite direction, whereby only that one of said areas as is angularly rotationally to the rear of each pattern will be effective to track a single source signal.

2. A direction finder comprising an antenna array including a central element and two pairs of diametrically spaced elements symmetrically disposed about said central element, coupling means for taking the voltage induced in said central element, coupling means for taking the difference in the voltage induced in the elements of one of said pairs, the elements of the other of said pairs being connected and grounded to provide a director and rear reflector for said central element, said elements of said one of said pairs also acting as side reflectors for said central element, and means comparing said voltages to produce a directional indication.

3. A direction finder comprising a rotatable base having an axis of rotation, a cross-connected pair of elements diametrically spaced and symmetrically positioned in relation to said axis, means for taking the difference between the voltages induced in said elements, a central element positioned on said axis, means for taking the voltage induced in said central antenna, and a second pair of elements arranged in a plane normal to the plane of said first pair of elements diametrically spaced with respect to said axis and grounded to said base plate.

4. A system for the multiplication of minute differences in variable separate sources of potential, comprising a first amplifier for each source, a separate unidirectional voltage amplifier for controlling the cathode and grid of each of said first amplifiers, said separate unidirectional voltage amplifiers being excited by the voltage from opposite ones of said first amplifiers whereby a voltage negative with respect to the controlled cathodes of the related ones of said first amplifiers is applied to such cathodes to squelch the circuit in one of said first amplifiers upon increase in potential in the other of said first amplifiers.

5. A system adaptable for use in a direction finder having a single antenna array with two difference overlapping sensitivity patterns, comprising means for taking induced voltage from each of said patterns, a first receiver for receiving voltage from one of said means, a second receiver for receiving voltage from the other of said means, said receivers being identical with their outputs combined in a single controlled unit, said receivers including a controlled amplification stage, a first bias unidirectional voltage control amplifier excited by the amplified voltage of said first receiver to reduce the sensitivity thereof, the voltage of said first bias control amplifier being applied to the controlled amplification stage of said second receiver, and a second bias control amplifier excited by the amplified voltage of said second receiver to reduce the sensitivity thereof, the voltage of said second bias control amplifier being applied to the controlled amplification stage of said first receiver.

6. A system for the multiplication of minute differences in value between two high or very high frequency potentials comprising a frequency-modulation receiver for each potential, each receiver having a controlled amplification stage and an uncontrolled limiter-audio-discriminator stage, a unidirectional voltage amplifier for each receiver with the grid thereof excited by the voltage from the cathode of the tube in said uncontrolled limiter-audio-discriminator stage, the amplified voltage from the said amplifier for each receiver being applied to the control grid of the tube in the controlled amplification stage of the other receiver, said amplified voltage being negative with respect to the controlled cathodes of the tubes on said amplification stages whereby the reception of a higher level potential in one receiver will lessen the amplification of the potential received by the other receiver and such lessened amplification will cause an increase in the amplification in said one receiver to greatly multiply the difference in said potentials.

7. In a direction finder an antenna array comprising a base revolving about a central vertical axis, a center element insulated from said base, a forward element and a rearward element directly grounded to said base, and a pair of side reflector elements insulated from said base, said array producing a wide angle figure 8 Adcock sensitivity pattern with a forward null and a narrow forwardly directed sensitivity pattern directed along said forward null and overlapping said Adcock pattern at two effective signal reception areas angularly spaced less than 90 degrees.

8. A system for the multiplication of minute differences in value between two radio frequency potentials comprising a frequency modulation receiver for each potential; said receivers having their audio outputs connected to a single device for measuring the difference in the potential output of said receivers; each of said receivers having a radio frequency amplification stage, a mixer stage, an intermediate frequency amplification stage, a discriminator stage and an audio stage; a single oscillator coupled with the mixer stage of each receiver to lower the frequency in each receiver and to keep the mixing voltage equal in level and the phase angles identical in each receiver, a unidirectional voltage amplifier for each receiver having the grid of such amplifier excited by the cathode voltage of said discriminator stage, the amplified plate voltage of the unidirectional voltage amplifier for each receiver being applied to the control grids of the radio frequency amplification stage, mixer stage, and intermediate frequency amplification stage of the other receiver, a voltage divider network for each unidirectional voltage amplifier, the cathodes of said last named stages of a receiver being connected to the voltage divider of the unidirectional voltage amplifier which applies its plate voltage to such receiver, whereby the reception of a higher level potential in one receiver will lessen the amplification of the potential received by the other receiver and such lessened amplification will cause an increase in said one receiver to greatly multiply the difference in said potentials.

References Cited in the file of this patent

UNITED STATES PATENTS

| | | |
|---|---|---|
| 2,063,534 | Wallace | Dec. 8, 1936 |
| 2,166,991 | Guanella | July 25, 1939 |
| 2,262,931 | Guanella | Nov. 18, 1941 |
| 2,318,338 | Simon et al. | May 4, 1943 |
| 2,400,641 | Hardy | May 21, 1946 |
| 2,416,096 | Hadfield | Feb. 18, 1947 |